(12) United States Patent
Eziyi

(10) Patent No.: US 12,359,674 B2
(45) Date of Patent: Jul. 15, 2025

(54) SYSTEM AND METHOD FOR INJECTING DRY GASES INTO GAS COMPRESSOR

(71) Applicant: Solar Turbines Incorporated, San Diego, CA (US)

(72) Inventor: Ifegwu Lekwauwa Kalu Eziyi, La Mesa, CA (US)

(73) Assignee: Solar Turbines Incorporated, San Diego, CA (US)

( * ) Notice: Subject to any disclaimer, the term of this patent is extended or adjusted under 35 U.S.C. 154(b) by 199 days.

(21) Appl. No.: 18/347,795

(22) Filed: Jul. 6, 2023

(65) Prior Publication Data

US 2025/0012289 A1 Jan. 9, 2025

(51) Int. Cl.
*F04C 29/00* (2006.01)
*F04D 29/12* (2006.01)
*F16J 15/40* (2006.01)

(52) U.S. Cl.
CPC ........ *F04D 29/124* (2013.01); *F04C 29/0014* (2013.01); *F16J 15/40* (2013.01)

(58) Field of Classification Search
CPC ...... F04D 29/124; F04C 29/0014; F24F 15/40
See application file for complete search history.

(56) References Cited

U.S. PATENT DOCUMENTS

| 3,909,012 A | * | 9/1975 | Denis | ........................ | F16J 15/40 |
| | | | | | 277/432 |
| 9,239,061 B2 | | 1/2016 | Kitano et al. | | |
| 9,822,790 B2 | | 11/2017 | Asti et al. | | |
| 11,035,471 B2 | | 6/2021 | Nakaniwa et al. | | |
| 11,326,466 B2 | | 5/2022 | Fischer et al. | | |
| 2014/0321972 A1 | | 10/2014 | Del Vescovo et al. | | |

FOREIGN PATENT DOCUMENTS

| CN | 203272059 U | 11/2013 |
| CN | 108679449 A | 10/2018 |
| CN | 113357122 A | 9/2021 |
| CN | 114688256 A | 7/2022 |
| WO | 2022117227 A1 | 6/2022 |

OTHER PUBLICATIONS

Written Opinion and International Search Report for Int'l. Patent Appln. No. PCT/US2024/033500, mailed Oct. 1, 2024 (14 pgs).

* cited by examiner

*Primary Examiner* — David E Sosnowski
*Assistant Examiner* — Jason G Davis

(57) ABSTRACT

A system for injecting dry gases into one or more gas compressors includes a nitrogen gas supply system to generate a stream of conditioned nitrogen gas, a process gas supply system to generate a stream of conditioned process gas, and a compression device. The compression device is configured to receive and pressurize the stream of conditioned nitrogen gas or the stream of conditioned process gas, and direct a pressurized stream of conditioned nitrogen gas or a pressurized stream of conditioned process gas towards the one or more gas compressors. The system includes a first valve that provides selective fluid communication between the nitrogen gas supply system and the compression device to direct the stream of conditioned nitrogen gas towards the compression device or selective fluid communication between the process gas supply system and the compression device to direct the stream of conditioned process gas towards the compression device.

20 Claims, 3 Drawing Sheets

SYSTEM AND METHOD FOR INJECTING DRY GASES INTO GAS COMPRESSOR

TECHNICAL FIELD

The present disclosure relates to a system and a method for injecting dry gases into one or more gas compressors.

BACKGROUND

Typically, gas compressors include various seals to prevent leakage of process gases from a compression space of the gas compressor and/or to prevent inflow of a lubricant, air, and the like into the compression space. As such gas compressors may be used to compress process gases that may be flammable/explosive, toxic, and/or corrosive, it may be desirable that the seals used in gas compressors do not use oil as a sealing material. Accordingly, many gas compressors now include dry gas seals that do not use oil as the sealing material.

A sealing gas is typically supplied to the dry gas seals. In most examples, the sealing gas is the process gas being supplied to the gas compressor. Some portion of the sealing gas being delivered to the dry gas seals may leak towards the atmosphere. In some examples, the process gases may include natural gases that include methane as a major constituent, or a blend of hydrogen gases and natural gases. A leakage of such process gases from the dry gas seals may increase greenhouse gas emissions during operation. Hence, a solution is desired that may reduce usage and subsequent leakage of sealing gases, especially greenhouse gases, into the atmosphere.

U.S. Pat. No. 9,239,061 describes a sealing system equipped with a dry gas seal having a rotating ring positioned between a casing and a rotor shaft and around the circumference of the rotor shaft, and stationary rings provided on the casing with elastic members interposed therebetween and so as to be capable of contacting the orthogonal edge surfaces of the rotating ring that are substantially orthogonal to the rotor shaft; a sealing gas channel having one end connected to a discharge channel, the other end connected so as to connect to a space between the casing and the outer perimeter surface of the rotating ring in the dry gas seal, and having a sealing gas regulating valve provided therein; and a drain gas channel having one end connected so as to connect to the space via a through hole formed in the casing below the rotating ring, and the other end connected to an intake channel.

SUMMARY OF THE DISCLOSURE

In an aspect of the present disclosure, a system for injecting dry gases into one or more gas compressors is provided. The system includes a nitrogen gas supply system to generate a stream of conditioned nitrogen gas. The system also includes a process gas supply system to generate a stream of conditioned process gas. The system further includes a compression device disposed in selective fluid communication with the nitrogen generator and the process gas supply system. The compression device is configured to receive the stream of conditioned nitrogen gas or the stream of conditioned process gas. The compression device is also configured to pressurize the stream of conditioned nitrogen gas or the stream of conditioned process gas. The compression device is further configured to direct a pressurized stream of conditioned nitrogen gas or a pressurized stream of conditioned process gas towards the one or more gas compressors. The system includes a first valve disposed upstream of the compression device along a gas flow direction. In a first state, the first valve provides selective fluid communication between the nitrogen gas supply system and the compression device to direct the stream of conditioned nitrogen gas towards the compression device. In a second state, the first valve provides selective fluid communication between the process gas supply system and the compression device to direct the stream of conditioned process gas towards the compression device.

In another aspect of the present disclosure, a method for injecting dry gases into one or more gas compressors is provided. The method includes providing a nitrogen gas supply system to generate a stream of conditioned nitrogen gas and a process gas supply system to generate a stream of conditioned process gas. The method also includes providing a compression device. The compression device is in selective fluid communication with the nitrogen gas supply system and the process gas supply system. The method further includes providing a first valve upstream of the compression device along a gas flow direction. The method includes operating the first valve in a first state or a second state. In the first state, the first valve provides selective fluid communication between the nitrogen gas supply system and the compression device to direct the stream of conditioned nitrogen gas towards the compression device. In the second state, the first valve provides selective fluid communication between the process gas supply system and the compression device to direct the stream of conditioned process gas towards the compression device. The method also includes receiving the stream of conditioned nitrogen gas or the stream of conditioned process gas at the compression device. The method further includes pressurizing, by the compression device, the stream of conditioned nitrogen gas or the stream of conditioned process gas. The method includes directing, by the compression device, a pressurized stream of conditioned nitrogen gas or a pressurized stream of conditioned process gas towards the one or more gas compressors.

Other features and aspects of this disclosure will be apparent from the following description and the accompanying drawings.

DETAILED DESCRIPTION

Wherever possible, the same reference numbers will be used throughout the drawings to refer to the same or like parts.

Figure 1:
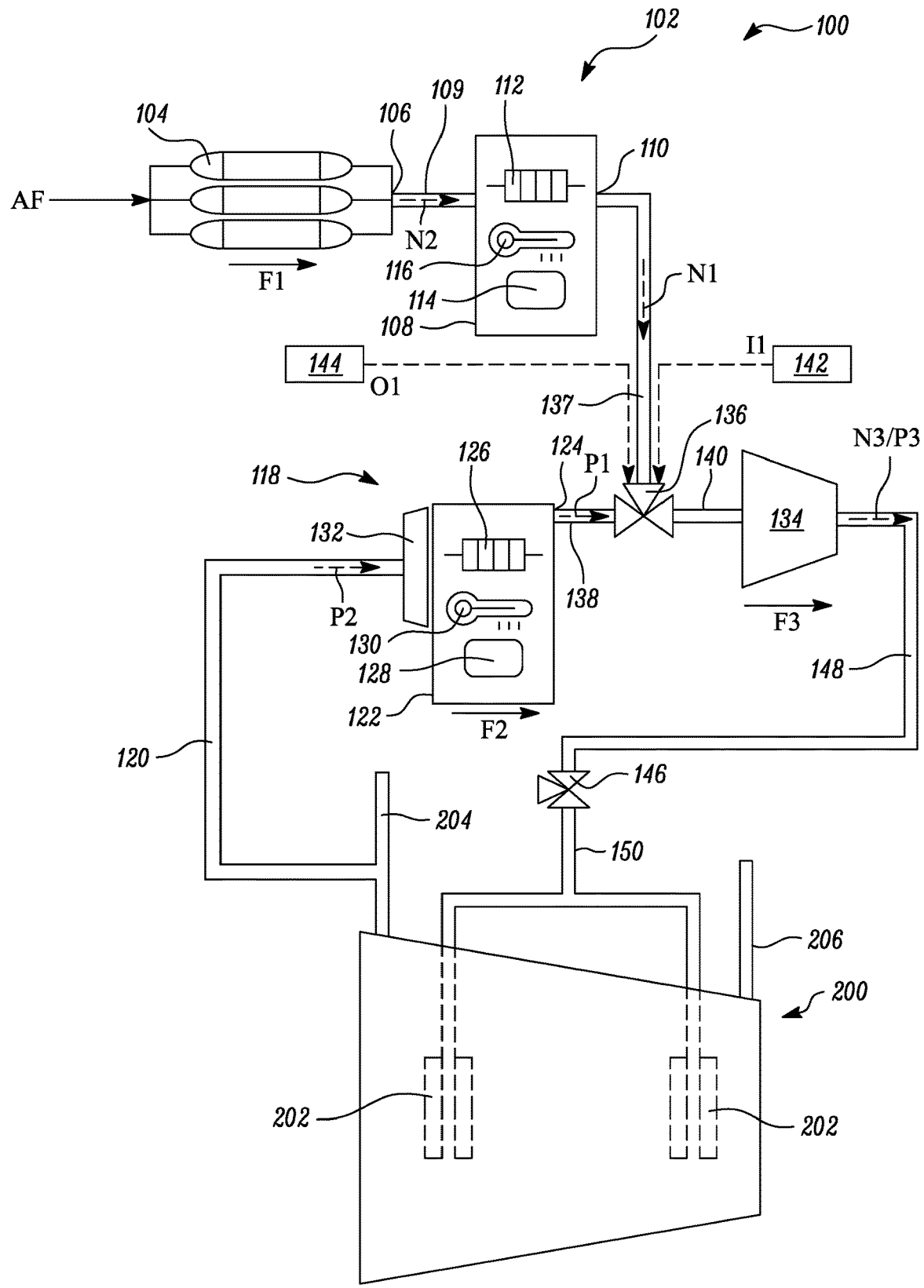
FIG. 1 is a schematic view of a system for injecting dry gases into one or more gas compressors, according to an example of the present disclosure.

Referring to FIG. 1, a schematic view of a system 100 for injecting dry gases into one or more gas compressors 200 is illustrated, according to an example of the present disclosure. Only one gas compressor 200 is illustrated herein. However, the system 100 may be used to inject dry gases into multiple gas compressors. Such multiple gas compressors may operate in tandem, may be mounted on separate skids, and the like.

The gas compressor 200 may include any conventional gas compressor usable for compressing and delivering process gases at a higher pressure. The gas compressor 200 may include various components (not shown) herein, such as, a casing, a rotating body such as an impeller, a screw rotor, a scroll rotor, axial flow type vanes, bladed rotors, and the like. Further, the gas compressor 200 may define a compression chamber (not shown) for accommodating the rotating body and compressing the process gases. Further, the gas compressor 200 may include a bearing section (not shown) for supporting a shaft of the rotating body.

Furthermore, the gas compressor 200 includes one or more dry gas seals 202 to prevent leakage of compressed process gases from the compression chamber and inflow of separation seal fluid and lubricant from the bearing section to the compression chamber. In the illustrated example, the gas compressor 200 includes two dry gas seals 202. The dry gas seals 202 may include any known in the art dry gas seals that may include components (not shown), such as, a stationary section fixed to the casing of the gas compressor 200, and a rotating section fixed to a shaft of the rotating body. It should be noted that the present disclosure is not limited to a design of the gas compressor 200 or the dry gas seals 202.

The gas compressor 200 receives the process gases from a suction line 204. The process gases enter the gas compressor 200 at a low pressure. Further, compressed process gases are discharged via a discharge line 206. The compressed process gases exit the gas compressor 200 at a higher pressure. Thus, the gas compressor 200 compresses the process gases in the compression chamber described above, and thereafter discharges the compressed process gases towards the discharge line 206.

The system 100 includes a nitrogen gas supply system 102 to generate a stream of conditioned nitrogen gas N1. The nitrogen gas supply system 102 includes a nitrogen generator 104 to generate a stream of nitrogen gas N2. In an example, the nitrogen generator 104 may include a nitrogen membrane. It should be noted that the nitrogen generator 104 may include any other device that generates nitrogen. The nitrogen generator 104 receives ambient air flow AF, and processes the ambient air flow AF to generate the stream of nitrogen gas N2. The nitrogen generator 104 may include suitable filters that may filter out impurities from the ambient air flow AF to supply a clean stream of nitrogen gas N2 at an output 106 of the nitrogen generator 104.

Further, the nitrogen gas supply system 102 includes a nitrogen gas conditioning unit 108 disposed downstream of the nitrogen generator 104 along a nitrogen gas flow direction F1. The nitrogen gas conditioning unit 108 is in fluid communication with the nitrogen generator 104 via a first fluid line 109. The nitrogen gas conditioning unit 108 receives and processes the stream of nitrogen gas N2 from the nitrogen generator 104 to generate the stream of conditioned nitrogen gas N1 available at an output 110. The nitrogen gas conditioning unit 108 may process the stream of nitrogen gas N2 to ensure that nitrogen gas being directed towards the dry gas seals 202 is above a dew point. Thus, the nitrogen gas conditioning unit 108 may ensure the stream of conditioned nitrogen gas N1 is dry and has a desired temperature. The nitrogen gas conditioning unit 108 includes a heater 112, a vapor-liquid separator 114, and a temperature sensor 116, without any limitations. It should be noted that the nitrogen gas conditioning unit 108 may include any gas conditioning unit known in the art.

The system 100 also includes a process gas supply system 118 to generate a stream of conditioned process gas P1. The process gas supply system 118 includes a process gas supply line 120 to supply a stream of process gas P2. In the illustrated example of FIG. 1, the process gas supply line 120 is in fluid communication with the suction line 204 of the gas compressor 200 to supply the stream of process gas P2. Thus, the stream of process gas P2 constitutes a portion of the process gases being directed towards the gas compressor 200 via the suction line 204. The stream of process gas P1 includes a stream of natural gas or a stream of a blend of natural gas and hydrogen gas. Further, the natural gas may include methane as one of its major constituent. For example, the natural gas may contain about 85% methane. It should be noted that the stream of process gas P1 may include any other gases/mixture of gases, as per application requirements.

The process gas supply system 118 also includes a process gas conditioning unit 122 disposed downstream of the process gas supply line 120 along a process gas flow direction F2. The process gas conditioning unit 122 receives and processes the stream of process gas P2 from the process gas supply line 120 to generate the stream of conditioned process gas P1 available at an output 124. The process gas conditioning unit 122 may process the stream of process gas P2 to ensure that process gas being directed towards the dry gas seals 202 is above a dew point. Thus, the process gas conditioning unit 122 may ensure the stream of conditioned process gas P1 is dry and has a desired temperature. The process gas conditioning unit 122 includes a heater 126, a vapor-liquid separator 128, and a temperature sensor 130, without any limitations. It should be noted that the process gas conditioning unit 122 may include any gas conditioning unit known in the art.

Further, the process gas supply system 118 also includes a filter 132 disposed upstream of the process gas conditioning unit 122 along the process gas flow direction F2. The filter 132 may remove impurities from the stream of process gas P2 before the stream of process gas P2 enters the process gas conditioning unit 122.

The system 100 further includes a compression device 134 disposed in selective fluid communication with the nitrogen gas supply system 102 and the process gas supply system 118. The compression device 134 receives the stream of conditioned nitrogen gas N1 or the stream of conditioned process gas P1. Further, the compression device 134 pressurizes the stream of conditioned nitrogen gas N1 or the stream of conditioned process gas P1. The compression device 134 directs a pressurized stream of conditioned nitrogen gas N3 or a pressurized stream of conditioned process gas P3 towards the one or more gas compressors 200. The compression device 134 may include any known compressor that receives and pressurizes fluids to increase a pressure thereof. Thus, the dry gases being directed towards the dry gas seals 202 include the pressurized stream of conditioned nitrogen gas N3 or the pressurized stream of conditioned process gas P3.

The system 100 also includes a first valve 136 disposed upstream of the compression device 134 along a gas flow direction F3. The first valve 136 is in fluid communication with the nitrogen gas conditioning unit 108 via a second fluid line 137. Further, the first valve 136 is in fluid communication with the process gas conditioning unit 122 via a third fluid line 138. Moreover, the first valve 136 is in fluid communication with the compression device 134 via a fourth fluid line 140.

The first valve 136 directs either the stream of conditioned nitrogen gas N1 or the stream of conditioned process gas P1 towards the compression device 134. The first valve 136 may operate in a first state or a second state. In the first state, the first valve 136 provides selective fluid communication between the nitrogen gas supply system 102 and the compression device 134 to direct the stream of conditioned nitrogen gas N1 towards the compression device 134. Specifically, in the first state, the stream of conditioned nitrogen gas N1 is directed towards the compression device 134 via the second and fourth fluid lines 137, 140. Thus, in the first state of the first valve 136, the compression device 134 receives the stream of conditioned nitrogen gas N1 and generates the pressurized stream of conditioned nitrogen gas N3. The pressurized stream of conditioned nitrogen gas N3 is subsequently directed towards the dry gas seals 202.

In the second state, the first valve 136 provides selective fluid communication between the process gas supply system 118 and the compression device 134 to direct the stream of conditioned process gas P1 towards the compression device 134. Specifically, in the second state, the stream of conditioned process gas P1 is directed towards the compression device 134 via the third and fourth fluid lines 138, 140. Thus, in the second state of the first valve 136, the compression device 134 receives the stream of conditioned process gas P1 and generates the pressurized stream of conditioned process gas P3. The pressurized stream of conditioned process gas P3 is subsequently directed towards the dry gas seals 202.

It should be noted that the first state is a default/preferred state of operation of the first valve 136. In other words, the first valve 136 always operates in the first state. However, based on an unavailability of the stream of conditioned nitrogen gas N1, the first valve 136 may be switched to the second state. In other words, the first valve 136 is switched between the first state and the second state as per an availability of the stream of conditioned nitrogen gas N1. Specifically, the first valve 136 may be switched between the first state and the second state based on the availability of the stream of conditioned nitrogen gas N1 at the output 110 of the nitrogen gas supply system 102. For example, if the nitrogen gas supply system 102 is not able to generate a desired amount of the stream of conditioned nitrogen gas N1 as required for operation of the dry gas seals 202, the first valve 136 may be operated in the second state to supply the pressurized stream of conditioned process gas P3 to the dry gas seals 202. However, if the nitrogen gas supply system 102 is able to generate the desired amount of the stream of conditioned nitrogen gas N1 as required for operation of the dry gas seals 202, the first valve 136 may be operated in the first state to supply the pressurized stream of conditioned nitrogen gas N3 to the dry gas seals 202.

In one example, the first valve 136 is switched between the first state and the second state based on receipt of an operator input I1. For example, if an operator determines that the nitrogen gas supply system 102 is not able to generate the desired amount of the stream of conditioned nitrogen gas N1, the operator may transmit the operator input I1 to the first valve 136 in order to switch the first valve 136 from the first state to the second state. Further, when the operator determines that the nitrogen gas supply system 102 is able to generate the desired amount of the stream of conditioned nitrogen gas N1, the operator may transmit the operator input I1 to the first valve 136 in order to switch the first valve 136 from the second state to the first state.

The nitrogen supply system 100 may include one or more sensors (not shown) that may indicate if the nitrogen gas supply system 102 is generating sufficient levels of the stream of conditioned nitrogen gas N1 as per the requirement at the dry gas seals 202. The sensor may be positioned between the nitrogen generator 104 and the nitrogen gas conditioning unit 108, or at the output 110 of the nitrogen gas conditioning unit 108. It should be noted that the sensor may be disposed at any other location, without any limitations. Based on the information from the sensors, the operator may provide the operator input I1 to switch the first valve 136 between the first and second states. It should be noted that the operator input I1 may be provided via an input device 142. The input device 142 may include a user interface or any other input device, without limitation.

In another example, the system 100 may include a controller 144. The controller 144 may generate an output signal O1 to switch the first valve 136 between the first and second states. The controller 144 may include one or more processors and one or more memories communicably coupled to the one or more processors. It should be noted that the one or more processors may embody a single microprocessor or multiple microprocessors for receiving various input signals. Each processor may further include a general processor, a central processing unit, an application specific integrated circuit (ASIC), a digital signal processor, a field programmable gate array (FPGA), a digital circuit, an analog circuit, a microcontroller, any other type of processor, or any combination thereof. Each processor may include one or more components that may be operable to execute computer executable instructions or computer code that may be stored and retrieved from the one or more memories.

The controller 144 may determine the unavailability of the stream of conditioned nitrogen gas N1. Specifically, the controller 144 may receive information corresponding to the unavailability of the stream of conditioned nitrogen gas N1 from the sensors of the nitrogen gas supply system 102. Further, the controller 144 may switch the first valve 136 from the first state to the second state to direct the stream of conditioned process gas P1 towards the compression device 134 based on the unavailability of the stream of conditioned nitrogen gas N1.

Further, the controller 144 also determines the availability of the stream of conditioned nitrogen gas N1. The controller 144 may receive information corresponding to the availability of the stream of conditioned nitrogen gas N1 from the sensors of the nitrogen gas supply system 102. Moreover, the controller 144 switches the first valve 136 from the second state to the first state to direct the stream of conditioned nitrogen gas N1 towards the compression device 134 based on the availability of the stream of conditioned nitrogen gas N1. Thus, based on the availability/unavailability of the stream of conditioned nitrogen gas N1, the controller 144 may transmit the output signal O1 to the first valve 136 to switch the first valve 136 between the first and second states.

The system 100 also includes a second valve 146 disposed downstream of the compression device 134 along the gas flow direction F3. The compression device 134 is in fluid communication with the second valve 146 via a fifth fluid line 148. Further, the second valve 146 is in fluid communication with the dry gas seals 202 via a sixth fluid line 150. The second valve 146 directs the pressurized stream of conditioned nitrogen gas N3 or the pressurized stream of conditioned process gas P3 towards the one or more dry gas seals 202 of the one or more gas compressors 200. The second valve 146 regulates a pressure of the pressurized stream of conditioned nitrogen gas N3 or the pressurized stream of conditioned process gas P3 being directed towards the one or more gas compressors 200. The second valve 146 ensures that the pressurized stream of conditioned nitrogen gas N3 or the pressurized stream of conditioned process gas P3 is directed towards the dry gas seals 202 at a desired pressure.

Figure 2:
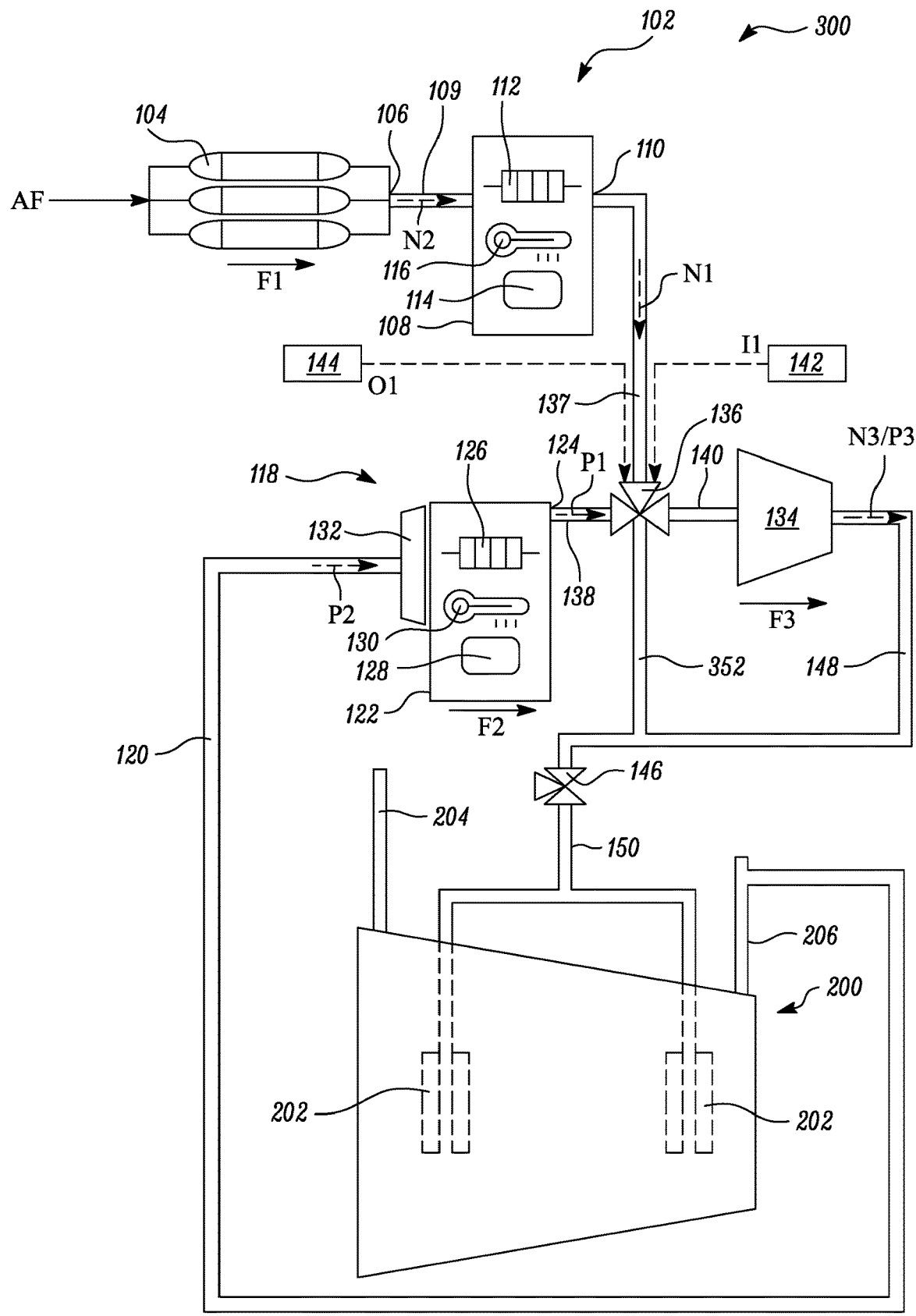
FIG. 2 is a schematic view of a system for injecting dry gases into one or more gas compressors, according to another example of the present disclosure.

FIG. 2 illustrates a system 300 for injecting dry gases into the one or more gas compressors 200, according to another example of the present disclosure. The system 300 is substantially similar to the system 100 with common components being referred to by the same reference numerals. However, in this example, the process gas supply line 120 is in fluid communication with the discharge line 206 of the gas compressor 200 to supply the stream of process gas P2. Specifically, instead of receiving the stream of process gas P2 from the suction line 204, the stream of process gas P2 is received from the discharge line 206. The stream of process gas P2 received from the discharge line 206 may have a higher pressure, as the discharge line 206 carries compressed process gases. In such examples, the system 300 further includes a gas bypass line 352 fluidly communicating the first valve 136 and the gas compressor 200. Specifically, in the illustrated example of FIG. 2, the first valve 136 is in fluid communication with the one or more dry gas seals 202 via the gas bypass line 352, the second valve 146, and the sixth fluid line 150.

When the process gas supply line 120 is in fluid communication with the discharge line 206 of the gas compressor 200, the stream of conditioned process gas P1 exiting the process gas conditioning unit 122 is directed towards the gas compressors 200 via the first valve 136 and the gas bypass line 352. In such examples, the stream of conditioned process gas P1 is not routed via the compression device 134, as the stream of conditioned process gas P1 may already have a higher pressure. Thus, the stream of conditioned process gas P1 exiting the process gas conditioning unit 122 is directly supplied to the one or more dry gas seals 202 via the third fluid line 138, the first valve 136, the gas bypass line 352, the second valve 146, and the sixth fluid line 150.

In some examples, it may be contemplated that the process gas conditioning unit 122 is directly connected to the second valve 146 via the gas bypass line 352, such that the stream of conditioned process gas P1 exiting the process gas conditioning unit 122 is supplied to the one or more dry gas seals 202 via the gas bypass line 352, the second valve 146, and the sixth fluid line 150.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The present disclosure relates to the system 100, 300 for injecting dry gases into the one or more gas compressors 200. The system 100, 300 selectively supplies the pressurized stream of conditioned nitrogen gas N3 or the pressurized stream of conditioned process gas P3 to the one or more dry gas seals 202. It should be noted that the system 100, 300 is configured to preferably supply the pressurized stream of conditioned nitrogen gas N3 to the dry gas seals 202. Thus, the system 100, 300 aims at reducing dependency on process gases, such as, process gases, thereby preventing a release of such greenhouse gases into the atmosphere. Thus, the system 100, 300 may reduce leakage of process gases, and, more specifically, greenhouse gases, towards the atmosphere and may ensure compliance with environmental regulatory standards.

Further, when the availability of the stream of nitrogen gas N2 is impacted, for example, due to a breakdown of the nitrogen generator 104 or the nitrogen gas conditioning unit 108, the first valve 136 may be switched to the second state to temporarily direct the pressurized stream of conditioned process gas P3 towards the dry gas seals 202. Further, when the availability of the stream of nitrogen gas N2 is restored, the first valve 136 may again switch back to the first state to direct the pressurized stream of conditioned nitrogen gas N3 towards the dry gas seals 202. The switching of the first valve 136 from the first state to the second state may ensure that dry gases are being supplied to the dry gas seals 202 at all times without shutting down the gas compressor 200, thereby reducing probability of downtime of the gas compressor 200. Further, the system 100, 300 includes the gas conditioning units 108, 122 that may ensure clean and dry gases are directed towards the dry gas seals 202, thereby reducing a probability of contamination of the components of the dry gas seals 202.

Figure 3:
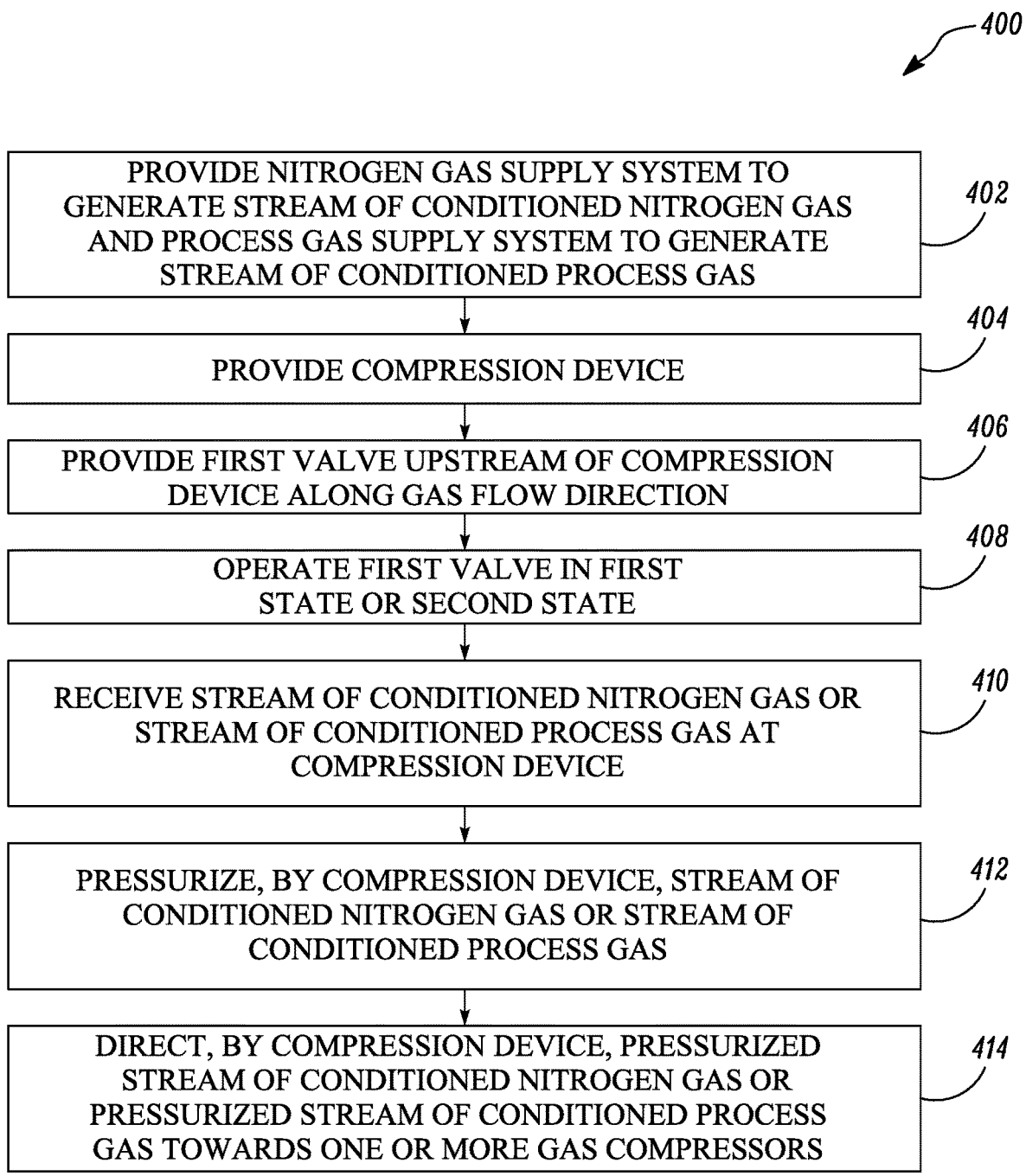
FIG. 3 is a flowchart of a method for injecting dry gases into one or more gas compressors, according to an example of the present disclosure.

FIG. 3 illustrates a method 400 for injecting dry gases into the one or more gas compressors 200. The method 400 will be described in relation to the system 100 shown in FIG. 1. Referring to FIGS. 1 and 3, at step 402, the nitrogen gas supply system 102 is provided to generate the stream of conditioned nitrogen gas N1 and the process gas supply system 118 is provided to generate the stream of conditioned process gas P1. At step 404, the compression device 134 is provided. The compression device 134 is in selective fluid communication with the nitrogen gas supply system 102 and the process gas supply system 118. At step 406, the first valve 136 is provided upstream of the compression device 134 along the gas flow direction F3.

At step 408, the first valve 136 is operated in the first state or the second state. In the first state, the first valve 136 provides selective fluid communication between the nitrogen gas supply system 102 and the compression device 134 to direct the stream of conditioned nitrogen gas N1 towards the compression device 134. In the second state, the first valve 136 provides selective fluid communication between the process gas supply system 118 and the compression device 134 to direct the stream of conditioned process gas P1 towards the compression device 134.

At step 410, the stream of conditioned nitrogen gas N1 or the stream of conditioned process gas P1 is received at the compression device 134. At step 412, the compression device 134 pressurizes the stream of conditioned nitrogen gas N1 or the stream of conditioned process gas P1. At step 414, the compression device 134 directs the pressurized stream of conditioned nitrogen gas N3 or the pressurized stream of conditioned process gas P3 towards the one or more gas compressors 200. Specifically, at the step 414, the compression device 134 directs the pressurized stream of conditioned nitrogen gas N3 or the pressurized stream of conditioned process gas P3 towards the one or more dry gas seals 202 of the one or more gas compressors 200, via the second valve 146.

In an example, the first valve 136 is switched between the first state and the second state based on receipt of the operator input I1. The first valve 136 is switched between the first state and the second state as per the availability of the stream of conditioned nitrogen gas N1.

In an example, the method 400 includes a step at which the controller 144 determines the unavailability of the stream of conditioned nitrogen gas N1. Further, the method 400 includes a step at which the controller 144 switches the first valve 136 from the first state to the second state to direct the stream of conditioned process gas P1 towards the compression device 134 based on the unavailability of the stream of conditioned nitrogen gas N1.

In another example, the method 400 includes a step at which the controller 144 determines the availability of the stream of conditioned nitrogen gas N1. Further, the method 400 includes a step at which the controller 144 switches the first valve 136 from the second state to the first state to direct the stream of conditioned nitrogen gas N1 towards the compression device 134 based on the availability of the stream of conditioned nitrogen gas N1.

In one example, the process gas supply line 120 of the process gas supply system 118 is fluidly communicated with the suction line 204 the one or more gas compressors 200 to supply the stream of process gas P2 to the process gas conditioning unit 122 of the process gas supply system 118 for generating the stream of conditioned process gas P1.

Further, referring to FIGS. 2 and 3, in another example, the process gas supply line 120 of the process gas supply system 118 is fluidly communicated with the discharge line 206 of the one or more gas compressors 200 to supply the stream of process gas P2 to the process gas conditioning unit 122 of the process gas supply system 118 for generating the stream of conditioned process gas P1. In such an example, the first valve 136 is fluidly communicated with the one or more gas compressors 200 via the gas bypass line 352. When the process gas supply line 120 is in fluid communication with the discharge line 206 of the one or more gas compressors 200, the stream of conditioned process gas P1 exiting the process gas conditioning unit 122 is directed towards the one or more gas compressors 200 via the first valve 136 and the gas bypass line 352.

It may be desirable to perform one or more of the steps shown in FIG. 3 in an order different from that depicted. Furthermore, various steps could be performed together.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed work machine, systems and methods without departing from the spirit and scope of the disclosure. Such embodiments should be understood to fall within the scope of the present disclosure as determined based upon the claims and any equivalents thereof.

What is claimed is:

1. A system for injecting dry gases into one or more gas compressors, the system comprising:
   a nitrogen gas supply system to generate a stream of conditioned nitrogen gas;
   a process gas supply system to generate a stream of conditioned process gas;
   a compression device disposed in selective fluid communication with the nitrogen gas supply system and the process gas supply system, wherein the compression device is configured to:
   receive the stream of conditioned nitrogen gas or the stream of conditioned process gas;
   pressurize the stream of conditioned nitrogen gas or the stream of conditioned process gas; and
   direct a pressurized stream of conditioned nitrogen gas or a pressurized stream of conditioned process gas towards the one or more gas compressors; and
   a first valve disposed upstream of the compression device along a gas flow direction, wherein, in a first state, the first valve provides selective fluid communication between the nitrogen gas supply system and the compression device to direct the stream of conditioned nitrogen gas towards the compression device, and wherein, in a second state, the first valve provides selective fluid communication between the process gas supply system and the compression device to direct the stream of conditioned process gas towards the compression device.

2. The system of claim 1, wherein the nitrogen gas supply system includes:
   a nitrogen generator to generate a stream of nitrogen gas; and
   a nitrogen gas conditioning unit disposed downstream of the nitrogen generator along a nitrogen gas flow direction, wherein the nitrogen gas conditioning unit is configured to receive and process the stream of nitrogen gas from the nitrogen generator to generate the stream of conditioned nitrogen gas available at an output.

3. The system of claim 1, wherein the process gas supply system includes:
   a process gas supply line to supply a stream of process gas; and
   a process gas conditioning unit disposed downstream of the process gas supply line along a process gas flow direction, wherein the process gas conditioning unit is configured to receive and process the stream of process gas from the process gas supply line to generate the stream of conditioned process gas available at an output.

4. The system of claim 3, wherein the process gas supply line is in fluid communication with a suction line of at least one of the one or more gas compressors to supply the stream of process gas.

5. The system of claim 3, wherein the process gas supply line is in fluid communication with a discharge line of at least one of the one or more gas compressors to supply the stream of process gas.

6. The system of claim 5, further comprising a gas bypass line fluidly communicating the first valve and the one or more gas compressors, wherein, when the process gas supply line is in fluid communication with the discharge line of at least one of the one or more gas compressors, the stream of conditioned process gas exiting the process gas conditioning unit is directed towards the one or more gas compressors via the first valve and the gas bypass line.

7. The system of claim 3, further comprising a filter disposed upstream of the process gas conditioning unit along the process gas flow direction.

8. The system of claim 1, wherein the first valve is switched between the first state and the second state based on receipt of an operator input, and wherein the first valve is switched between the first state and the second state as per an availability of the stream of conditioned nitrogen gas.

9. The system of claim 1, further comprising a controller configured to:
determine an unavailability of the stream of conditioned nitrogen gas; and
switch the first valve from the first state to the second state to direct the stream of conditioned process gas towards the compression device based on the unavailability of the stream of conditioned nitrogen gas.

10. The system of claim 9, wherein the controller is further configured to:
determine an availability of the stream of conditioned nitrogen gas; and
switch the first valve from the second state to the first state to direct the stream of conditioned nitrogen gas towards the compression device based on the availability of the stream of conditioned nitrogen gas.

11. The system of claim 1, further comprising a second valve disposed downstream of the compression device along the gas flow direction, wherein the second valve is configured to regulate a pressure of the pressurized stream of conditioned nitrogen gas or the pressurized stream of conditioned process gas being directed towards the one or more gas compressors.

12. The system of claim 11, wherein the second valve is configured to direct the pressurized stream of conditioned nitrogen gas or the pressurized stream of conditioned process gas towards one or more dry gas seals of the one or more gas compressors.

13. The system of claim 1, wherein the stream of process gas includes at least one of a stream of natural gas and a stream of a blend of natural gas and hydrogen gas.

14. A method for injecting dry gases into one or more gas compressors, the method comprising:
providing a nitrogen gas supply system to generate a stream of conditioned nitrogen gas and a process gas supply system to generate a stream of conditioned process gas;
providing a compression device, wherein the compression device is in selective fluid communication with the nitrogen gas supply system and the process gas supply system;
providing a first valve upstream of the compression device along a gas flow direction;
operating the first valve in a first state or a second state, wherein, in the first state, the first valve provides selective fluid communication between the nitrogen gas supply system and the compression device to direct the stream of conditioned nitrogen gas towards the compression device, and wherein, in the second state, the first valve provides selective fluid communication between the process gas supply system and the compression device to direct the stream of conditioned process gas towards the compression device;
receiving the stream of conditioned nitrogen gas or the stream of conditioned process gas at the compression device;
pressurizing, by the compression device, the stream of conditioned nitrogen gas or the stream of conditioned process gas; and
directing, by the compression device, a pressurized stream of conditioned nitrogen gas or a pressurized stream of conditioned process gas towards the one or more gas compressors.

15. The method of claim 14, further comprising fluidly communicating a process gas supply line of the process gas supply system with a suction line of at least one of the one or more gas compressors to supply the stream of process gas to a process gas conditioning unit of the process gas supply system for generating the stream of conditioned process gas.

16. The method of claim 14, further comprising:
fluidly communicating a process gas supply line of the process gas supply system with a discharge line of at least one of the one or more gas compressors to supply the stream of process gas to a process gas conditioning unit of the process gas supply system for generating the stream of conditioned process gas; and
fluidly communicating the first valve and the one or more gas compressors via a gas bypass line, wherein, when the process gas supply line is in fluid communication with the discharge line of at least one of the one or more gas compressors, the stream of conditioned process gas exiting the process gas conditioning unit is directed towards the one or more gas compressors via the first valve and the gas bypass line.

17. The method of claim 14, further comprising switching the first valve between the first state and the second state based on receipt of an operator input, wherein the first valve is switched between the first state and the second state as per an availability of the stream of conditioned nitrogen gas.

18. The method of claim 14, further comprising:
determining, by a controller, an unavailability of the stream of conditioned nitrogen gas; and
switching, by the controller, the first valve from the first state to the second state to direct the stream of conditioned process gas towards the compression device based on the unavailability of the stream of conditioned nitrogen gas.

19. The method of claim 18, further comprising:
determining, by a controller, an availability of the stream of conditioned nitrogen gas; and
switching, by the controller, the first valve from the second state to the first state to direct the stream of conditioned nitrogen gas towards the compression device based on the availability of the stream of conditioned nitrogen gas.

20. The method of claim 14, wherein the step of directing, by the compression device, the pressurized stream of conditioned nitrogen gas or the pressurized stream of conditioned process gas towards the one or more gas compressors includes directing the pressurized stream of conditioned nitrogen gas or the pressurized stream of conditioned process gas towards one or more dry gas seals of the one or more gas compressors, via a second valve.

* * * * *